United States Patent [19]

Stewart

[11] Patent Number: 4,567,390
[45] Date of Patent: Jan. 28, 1986

[54] INTERNAL LINE BREAK ASSEMBLY

[75] Inventor: Robert S. Stewart, North Syracuse, N.Y.

[73] Assignee: Carrier Corporation, Syracuse, N.Y.

[21] Appl. No.: 637,239

[22] Filed: Aug. 2, 1984

[51] Int. Cl.⁴ .................... H02K 11/00; H01H 37/04
[52] U.S. Cl. ................................ 310/68 C; 337/372; 337/380
[58] Field of Search .............. 310/68 C; 337/380, 372, 337/381, 363; 248/316.7, 27.1

[56] References Cited

U.S. PATENT DOCUMENTS 4,061,935 12/1977 Kandpal .......................... 310/68 C
4,186,318 1/1980 Anderson ........................ 310/68 C
4,236,092 11/1980 DiFlora .......................... 310/68 C Primary Examiner—Harold Broome
Attorney, Agent, or Firm—David J. Zobkiw

[57] ABSTRACT

An internal line break assembly for a hermetic compressor is assembled in two stages. A metal protector bracket is mounted to the stator as part of the mounting procedure for the stator. At a suitable later step a thermal protector in a protector mount is snapped into place whereby it is held in a spring biased relationship by the metal protector bracket.

2 Claims, 5 Drawing Figures

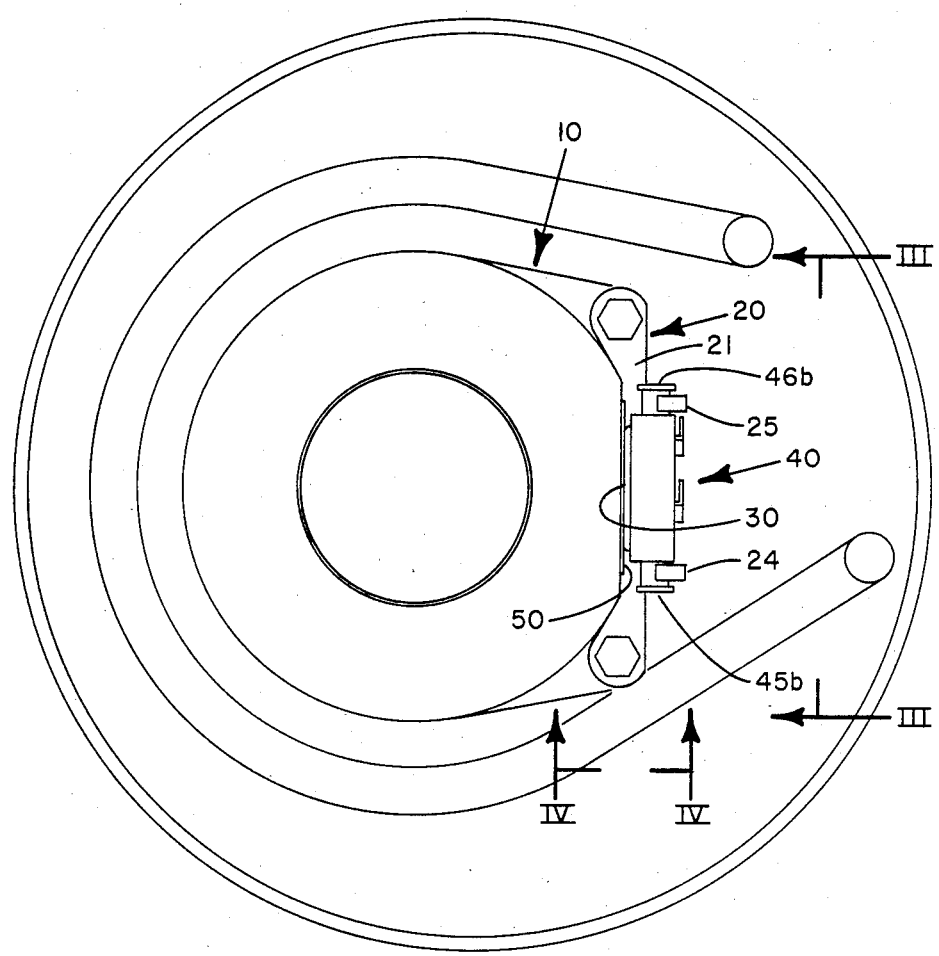
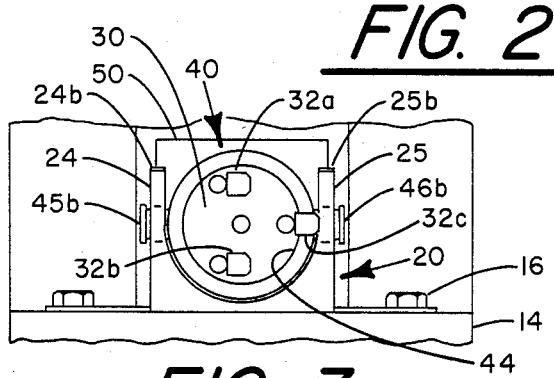
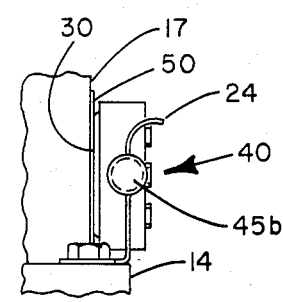

INTERNAL LINE BREAK ASSEMBLY

BACKGROUND OF THE INVENTION

It is standard practice to provide thermal protection for a motor by placing a protector in contact with the windings of the motor. The protector contains a thermally responsive switch which opens to break an electrical circuit and to, thereby, cut off electrical power to the motor. In assembling the motor-compressor unit for a hermetic compressor, it is necessary to install a thermal protector as part of the assembly. Plastic tie wraps encircling the motor winding and protector is a common method of assembly. Plastic has temperature limits and can fail and, thereby, cause loss of protection and complete failure of the motor if proper conditions exist. In addition, the use of the wraps is cumbersome and dictates the point of the assembly operation at which the protector is assembled. Because of the space limitations of the hermetic motor-compressor unit, the order of assembling the components can present some difficulties resulting in additional expense.

SUMMARY OF THE INVENTION

The present invention is directed to a method and apparatus for assembling the thermal protector for a hermetic compressor. Assembly is achieved in a two step process. A metal protector bracket with two spring clip risers is mounted to the stator by bolts as part of the mounting procedure for the stator. At a suitable later step in the assembly operation, the thermal protector is placed in the protector mount and snapped into place with the spring clip risers biasing the protector in place. The electrical connections to the connector can then be made.

It is an object of this invention to provide a method and apparatus for assembling a thermal protector to a motor winding.

It is another object of this invention to provide apparatus that will not fail the protection system if excessive fault temperatures are encountered. These objects, and others, as will become apparent hereinafter, are accomplished by the present invention.

Basically, a thermal protector is located in a protector mount which is spring biased by a protector bracket such that the thermal protector is held in contact with the windings of the motor. The assembly is made by securing the protector bracket to the stator when the stator is assembled in place. The protector is mounted in the protector mount which is snapped into place and secured by the protector bracket at any suitable later step in the assembly.

BRIEF DESCRIPTION OF THE DRAWINGS

For a fuller understanding of the present invention, reference should now be made to the following detailed description thereof taken in conjunction with the accompanying drawings wherein:

FIG. 2 is a top view of the assembled line break assembly in a hermetic compressor;

FIG. 3 is a view taken along line III—III of FIG. 2;

FIG. 4 is a view taken along line IV—IV of FIG. 2; and

DESCRIPTION OF THE PREFERRED EMBODIMENT

Figure 1:
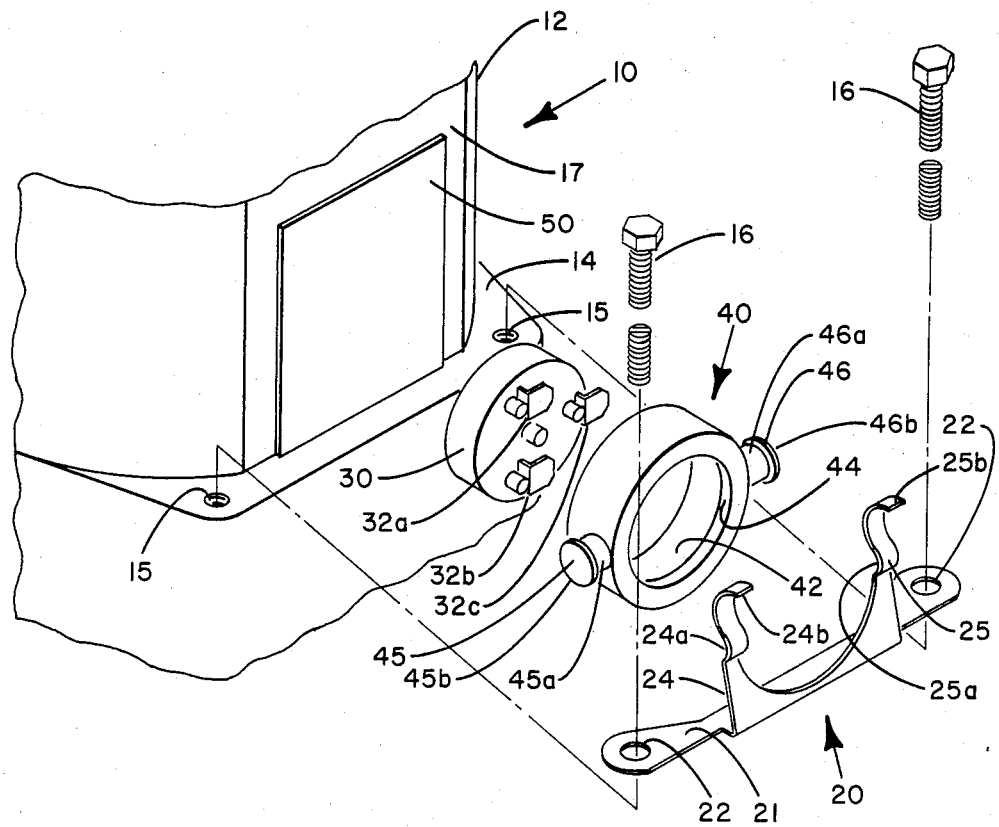
FIG. 1 is an exploded view of the internal line break assembly of the present invention.
Figure 5:
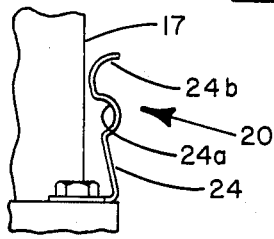
FIG. 5 is a view corresponding to FIG. 4, but with only the protector bracket in place.

In the Figures, the numeral 10 generally designates the stator of a motor-compressor unit of a hermetic compressor. The stator 10 has motor windings 12 and a core 14. A number of holes 15 are formed in core 14 for receiving bolts 16 which secure stator 10 to the compressor (not illustrated). According to the teachings of the present invention, when bolts 16 are being placed to secure the stator 10 to the compressor, two of the adjacent circumferentially spaced bolts 16 are inserted in holes 22 of spring metal protector bracket 20 before being inserted in corresponding holes 15. When the two adjacent bolts are tightened into place they thereby cause the two spaced spring clip risers 24 and 25 to be slightly spaced from flat face 17 of stator 10, as is best shown in FIG. 5. The spring clip risers 24 and 25, in the unstressed state, form an angle of approximately 75°–80° with the base 21 of bracket 20 and have grooves or depressions 24a and 25a formed therein, which serve as detents, as well as outwardly curved ends 24b and 25b. Grooves 24a and 25a and the corresponding curved ends 24b and 25b makes an ess as is best shown in FIG. 5.

At any convenient subsequent point in the assembly of the motor-compressor unit, the motor protector 30 is placed in the recess 42 formed in protector mount 40 such that electrical terminals or connectors 32a–c extend through opening 44 in mount 40 as is best shown in FIG. 3. Mount 40 is made of a suitable plastic such as Valox and has a pair of diametrically extending ears 45 and 46 respectively made up of cylindrical portions 45a and 46a and flange portions 45b and 46b. The cylindrical portions 45a and 46a are dimensioned to be received in grooves 24a and 25a, respectively. With protector 30 in place in the recess 42 of protector mount 40, and facing flat face 17, the cylindrical portions 45a and 46a of ears 45 and 46 are caused to engage curved ends 24b and 25b, respectively, of risers 24 and 25 in a cammed of wedging engagement, whereby, curved ends 24b and 25b are forced outwardly from flat face 17. This permits protector 30 and mount 40 to be moved as a unit until cylindrical portions 45a and 46a are received in grooves 24a and 25a in a detent relationship permitting risers 24 and 25 to spring back to the position of FIG. 4 where risers 24 and 25 are still flexed and provide a spring bias to hold protector 30 in engagement with face 17. If necessary, or desired, the protector 30 and mount 40 can be removed from engagement with the motor windings by reversing the process.

With the protector 30 and mount 40 held in place by risers 24 and 25 of bracket 20, a sheet of electrical insulation 50 is slid between protector 30 and face 17. The purpose of the insulation 50 is to electrically insulate the protector 30 from the motor windings 12. Either prior to or after the placing of the insulation 50, the three motor leads with flag connectors (not illustrated) are connected to the protector terminals or connectors 32a–c. Alternately, the insulation 50 can be in place when the protector and mount are put into position, as described above.

Although a preferred embodiment of the present invention has been illustrated and described, other changes will occur to those skilled in the art. It is, therefore, intended that the present invention is to be limited only by the scope of the appended claims.

What is claimed is:

1. An internal line break assembly for a hermetic compressor comprising:
   a protector means for sensing the temperature of a motor winding and for cutting off electric power to the motor responsive thereto;
   a protector mount means having a recess formed therein for receiving said protector means;
   resiliently deformable bracket means coacting with said protector mount means having said protector means therein to bias said protector means into thermal contact with said motor winding; and
   said protector mount means further having a pair of diametrically extending ears each including a cylindrical portion and a flange portion with said cylindrical portions coacting with said bracket means in the nature of a wedge to cause said protector means to be held in biased thermal contract with said motor winding.

2. The internal line break assembly of claim 1 wherein said bracket means includes a spaced pair of spring clip risers each having a groove for receiving a corresponding one of said cylindrical portions and curved ends which together with said grooves make an ess.

* * * * *